(12) United States Patent
Fackenthall et al.

(10) Patent No.: US 6,216,184 B1
(45) Date of Patent: *Apr. 10, 2001

(54) EXTENDED RISER FOR IMPLEMENTING A CABLELESS FRONT PANEL INPUT/OUTPUT

(75) Inventors: Aleph Fackenthall, Portland; Russ Hampsten, Aloha; Hermann Gartler, Portland, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,970

(22) Filed: Sep. 11, 1997

(51) Int. Cl.[7] .................................................... G06F 13/00
(52) U.S. Cl. ............................................................ 710/101
(58) Field of Search ................................... 395/282, 281; 710/101, 102

(56) References Cited

U.S. PATENT DOCUMENTS

| | | | |
|---|---|---|---|
| 4,816,810 | * | 3/1989 | Moore .................. 340/710 |
| 5,065,360 | * | 11/1991 | Kelly ..................... 395/800 |
| 5,338,214 | | 8/1994 | Steffes et al. . |
| 5,406,453 | | 4/1995 | Cusato et al. . |
| 5,505,533 | * | 4/1996 | Kammersqard et al. ......... 312/236 |
| 5,513,329 | | 4/1996 | Pecone . |
| 5,519,573 | | 5/1996 | Cobb et al. . |
| 5,544,006 | | 8/1996 | Radloff et al. . |
| 5,555,158 | * | 9/1996 | Dent ...................... 361/684 |
| 5,594,621 | | 1/1997 | van Rumpt . |
| 5,604,871 | | 2/1997 | Pecone . |
| 5,838,559 | * | 11/1998 | Lam ...................... 363/146 |

* cited by examiner

*Primary Examiner*—David A Wiley
(74) *Attorney, Agent, or Firm*—Blakely, Sokoloff, Taylor & Zafman LLP

(57) ABSTRACT

A riser card for use in a chassis includes a body having a first end and a second end. The length of the body is adequate to simultaneously allow the first end and the second end to be proximately situated at a back and a front wall of the chassis respectively. The riser card also includes a female edge connector disposed on the body that receives a male edge connector of a motherboard.

16 Claims, 5 Drawing Sheets

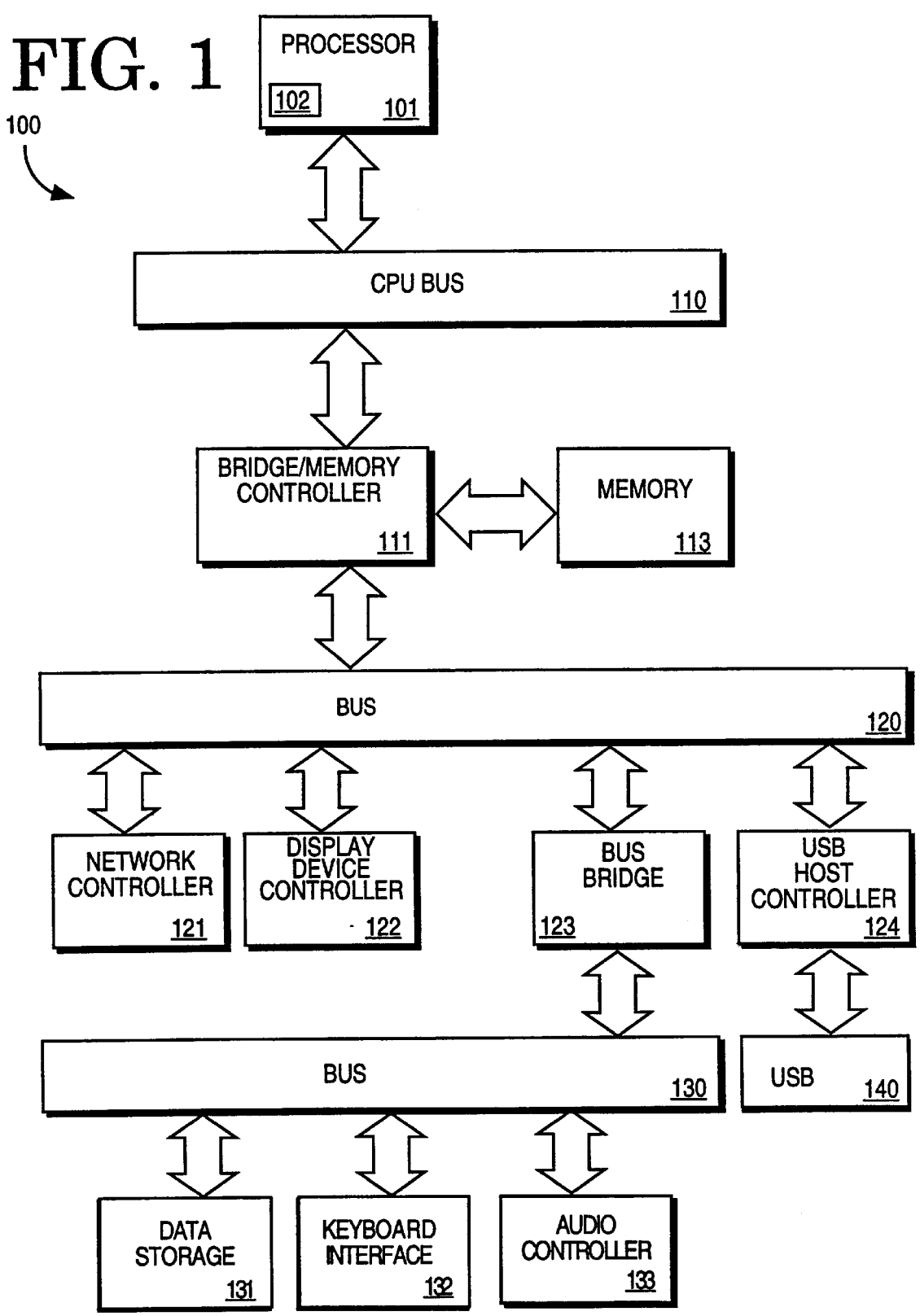

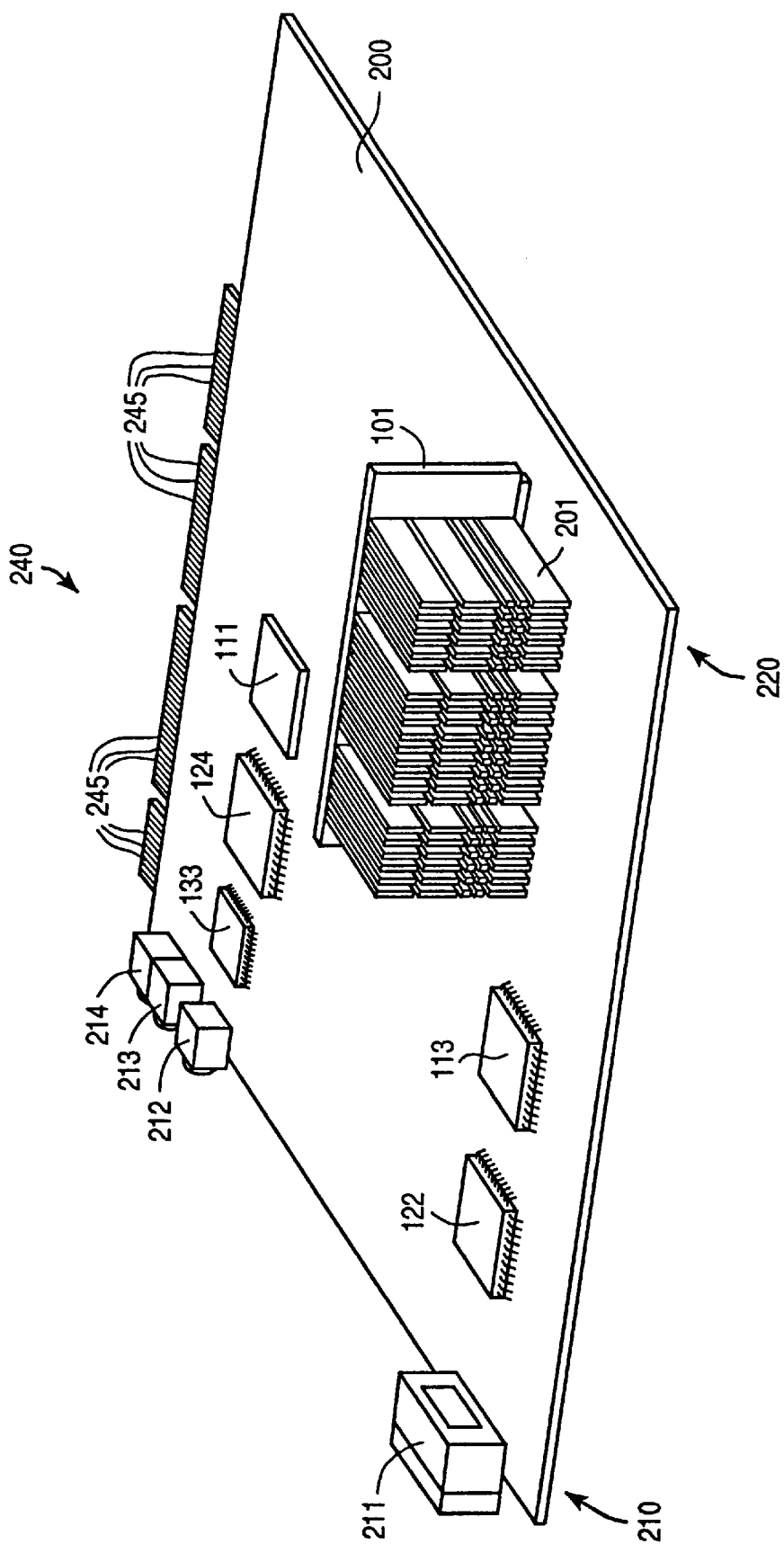
FIG_2

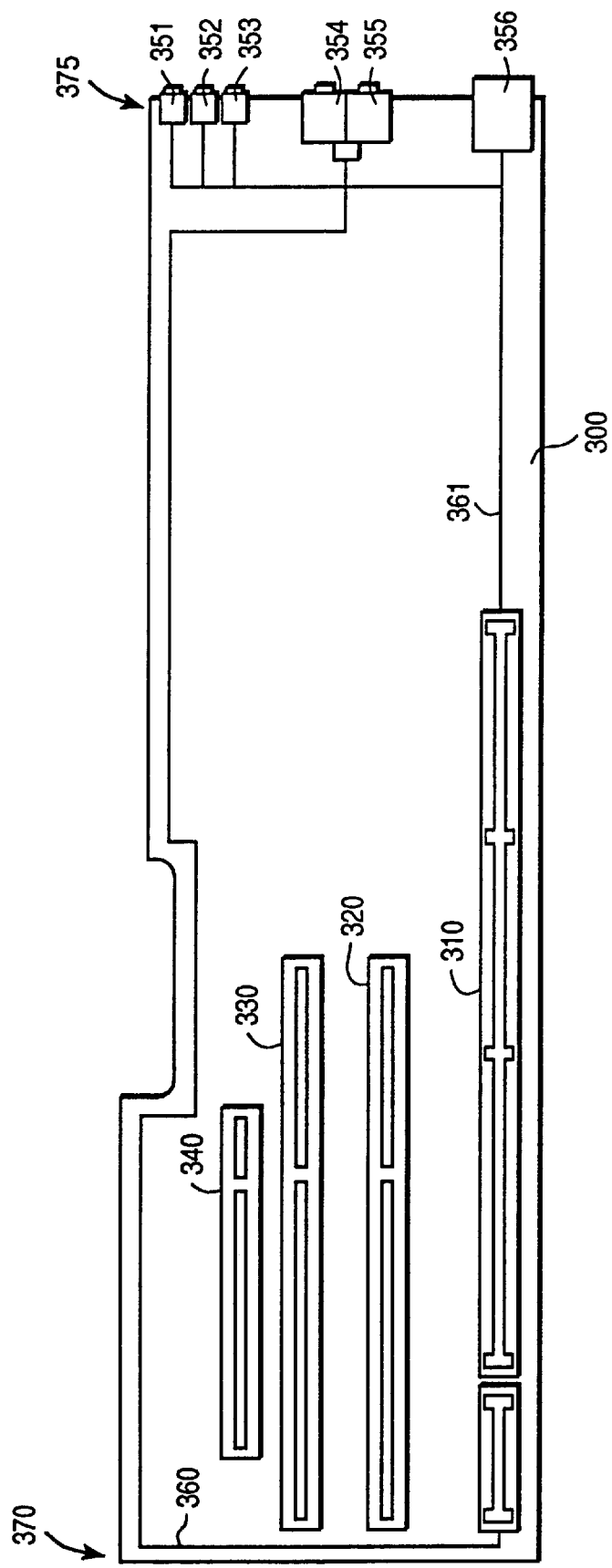
FIG_3

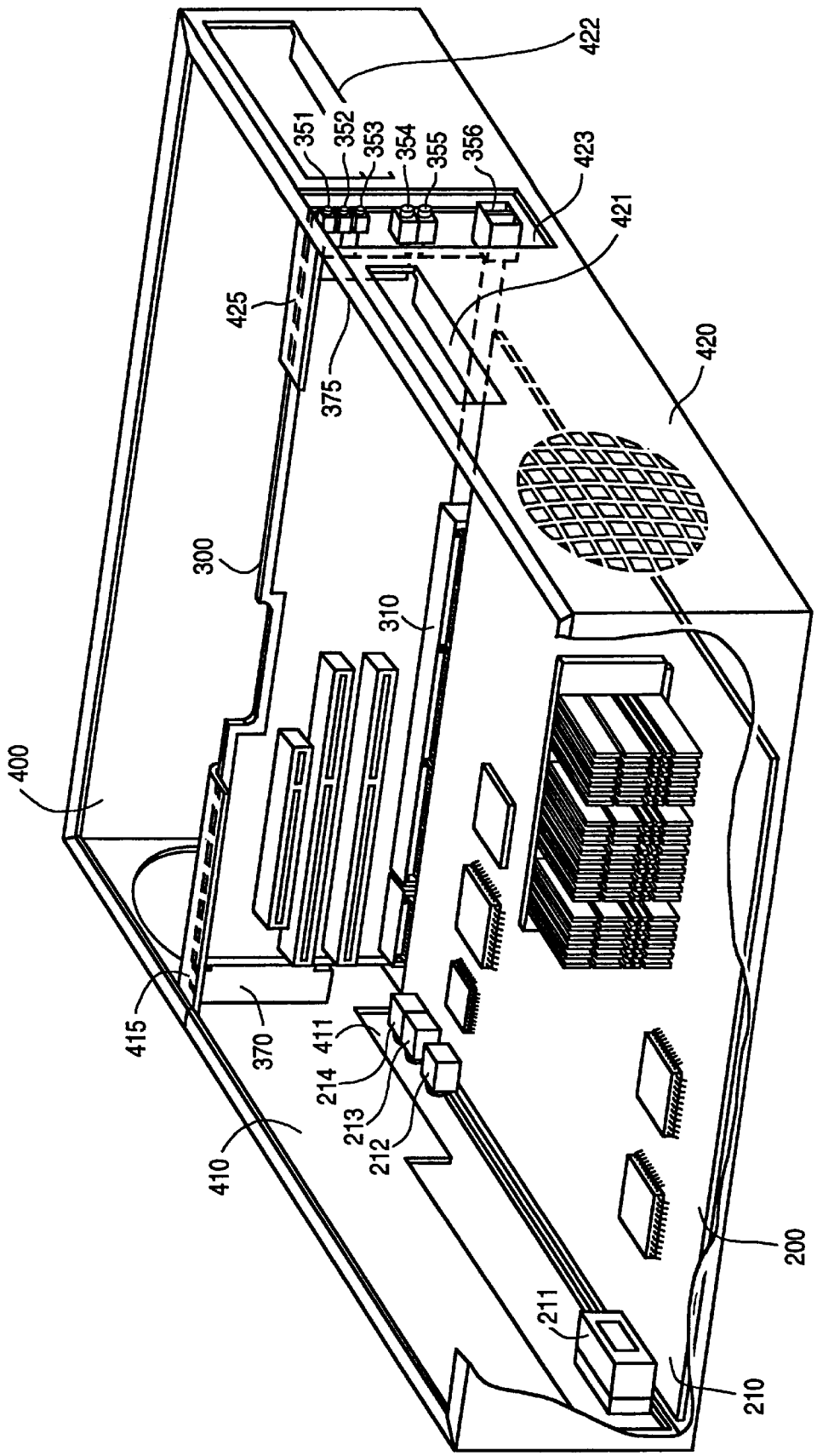
FIG_4

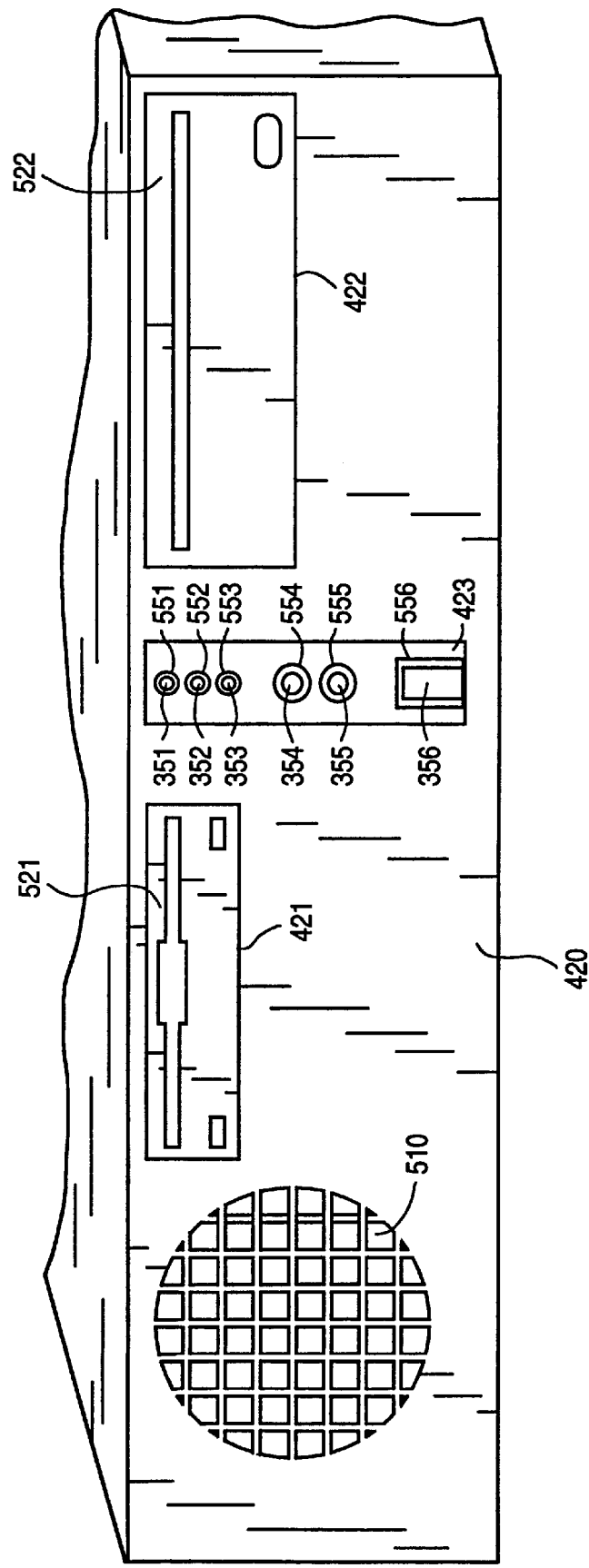
FIG_5

EXTENDED RISER FOR IMPLEMENTING A CABLELESS FRONT PANEL INPUT/OUTPUT

FIELD OF THE INVENTION

The present invention relates to the field of computer systems. More specifically, the present invention relates to electrical signals that are transmitted onto and off of a motherboard of a computer system.

BACKGROUND OF THE INVENTION

Video playback, enhanced graphics, and extended audio connectivity are becoming the standard hardware building blocks to support multimedia. To achieve cost savings, these features are being integrated onto the motherboard. Sound and graphics add-in cards that were once required to support multimedia functionalities are now being integrated onto the motherboard in the form of specialized application specific integrated circuits (ASICs) and in other instances are being brought into the processor itself. To achieve this integration, multimedia outputs need to be transmitted off the motherboard and multimedia inputs need to be transmitted onto the motherboard. Specifically, it is desirable to bring audio connectors, Universal Serial Bus connectors, as well as other indicators and switches to the front panel of a computer system chassis. The front panel of the computer system chassis is a location that is most accessible to the computer user. However, with today's form factors, it is a challenge to bring more input/output (I/O) connectivity out of the chassis and to the front panel.

One approach to bringing audio and video I/O out of the chassis in the past was to use cables to connect motherboard components to connectors mounted on spare expansion slots on the chassis. This approach had several disadvantage. First, the use of cables incurred additional costs. Second, cabling the motherboard components to connectors required additional time and resources from the manufactures.

SUMMARY

A riser card for use in a chassis according to a first embodiment of the present invention is disclosed. The riser card includes a body having a first end and a second end. The length of the body is adequate to simultaneously allow the first end and the second end to be proximately situated at a back and a front wall of the chassis respectively. The riser card also includes a female edge connector disposed on the body that receives a male edge connector of a motherboard.

BRIEF DESCRIPTION OF THE DRAWINGS

The present invention is illustrated by way of example and not by way of limitation in the figures of the accompanying drawings, in which like references indicate similar elements and in which:

FIG. 1 is a block diagram illustrating an exemplary computer system according to an embodiment of the present invention;

FIG. 2 illustrates a perspective view of a motherboard according to an embodiment of the present invention;

FIG. 3 illustrates a riser according to an embodiment of the present invention;

FIG. 4 illustrates a perspective view of a motherboard connected to a riser housed inside a chassis, according to an embodiment of the present invention; and FIG. 5 illustrates a front view of a chassis housing a computer system, according to an embodiment of the present invention.

DETAILED DESCRIPTION

Referring to FIG. 1, a computer system upon which an embodiment of the present invention can be implemented is shown as 100. The computer system 100 includes a processor 101 that processes digital data signals. The processor 101 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 which transmits data signals between processor 101 and other components in the computer system 100.

As an example, memory 113 may be a dynamic random access memory (DRAM) device, a static random access memory (SRAM) device, or other memory device. The memory 113 stores information or other intermediate data signals that are executed by the processor 101. A cache memory 102 resides inside processor 101 that stores information or other intermediate data that is stored in memory 113. The cache 102 speeds up memory accesses by the processor 101 by taking advantage of its locality of access. In an alternate embodiment of the computer system 100, the cache 102 resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals from these components to a high speed I/O bus 120.

The high speed I/O bus 120 supports peripherals operating at high data throughput rates. The high speed I/O bus 120 may be a single bus or a combination of multiple buses. As an example, the high speed I/O bus 120 may comprise a Peripheral Components Interconnect (PCI) bus, a Personal Computer Memory Card International Association (PCMCIA) bus or other buses. The high speed I/O bus 120 provides communication links between components in the computer system 100. A network controller 121 links a network of computers together and provides communication among the machines. A display device controller 122 is coupled to the high speed I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100.

Universal Serial Bus (USB) 140 is a cable bus that supports data exchange between the high speed I/O bus 120 and a wide range of simultaneously accessible peripherals or USB devices. Host controller 124 interfaces the high speed I/O bus 120 with the USB 140. For data signals transmitted from the high speed I/O bus 120, the host controller 124 converts protocol and data information from the computer system's native format to a bit stream transmitted on the USB 140. For data signals transmitted from the USB 140, the host controller 124 converts the bit stream of protocol and data signal information on the USB to the computer system's native format. The host controller 124 reports and manages the states of the USB 140.

An I/O bus 130 is used for communicating information between peripheral devices that operate at lower throughput rates. The I/O bus 130 may be a single bus or a combination of multiple buses. As an example, the I/O bus 130 may comprise an Industry Standard Architecture (ISA) bus, an Extended Industry Standard Architecture (EISA) bus or a Micro Channel Architecture (MCA) bus. The I/O bus 130 provides communication links between components in the computer system 100. A keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. A data storage device 131 may be a hard disk drive, a floppy disk drive, a CD-ROM device, a flash memory device or other mass storage device. An audio controller 133 operates to coordinate the recording and playing of sounds is also coupled to the I/O bus 130. A bus bridge 123 couples the high speed I/O bus 120 to the I/O bus 130. The bus bridge 123 comprises a translator to bridge data signals between the high speed I/O bus 120 and the I/O bus 130.

According to an embodiment of the present invention, the processor 101, the CPU bus 110, the bridge/memory controller 111 and the memory 113 reside on a motherboard. According to an alternate embodiment of the present invention, the computer system 100 resides on a motherboard.

FIG. 2 illustrates a perspective view of a motherboard according to an embodiment of the present invention. The motherboard 200 is a printed circuit board that operates to physically hold components in the computer system 100 (shown in FIG. 1). The motherboard also provides electrical contacts that electrically connect the components in the computer system 100. Only some of the components in the computer system 100 are illustrated on the motherboard 200 in this example. It should be appreciated that a subset of the components in the computer system 100 may reside on the motherboard 200 and that other components in the computer system 100 may reside external to the motherboard 200. It should also be appreciated that all of the components in the computer system 100 may reside on the motherboard 200.

The processor 101 resides on the motherboard 200. The processor 101 is illustrated as a processor cartridge. It should be appreciated that the processor 101 may also be implemented as a single integrated circuit or a plurality of integrated circuits. A heat sink 201 is thermally connected to the processor 101. The heat sink 201 operates to transfer heat away from the processor by dissipating heat generated by the processor through the heat sink's surface area. The memory 113, display device controller 122, audio controller 133, USB controller 124, and the bridge memory controller 111 also reside on the motherboard and are also implemented using integrated circuits.

The motherboard 200 includes a front end 220 and a back end 210. Several external interfaces 211–214 are connected to the motherboard 200 at its back end 210. The external interfaces 211–214 may be used to connect peripheral devices to the motherboard. The external interfaces 211–214 operate to transmit signals from peripheral devices onto the motherboard 200 or transmit signals from the motherboard 200 to the peripheral device or both. For example, external interface 211 may operate as a connector for connecting the motherboard 200 to a display device. External interface 212 may operate as a connector for connecting the motherboard 200 to audio speakers. External interface 213 may operate as a connector for connecting the motherboard 200 to a keyboard. External interface 214 may operate as a connector for connecting motherboard 200 to a printer. When the motherboard 200 is mounted in a chassis, the motherboard 200 is oriented such that the external interfaces 211–214 extend through an opening or a plurality of openings on a back wall of the chassis and are accessible from outside the chassis.

The motherboard 200 also includes an edge connection 240. The edge connection 240 includes a plurality of electrically conductive contacts 245 that are electrically connected to electrical contacts on the motherboard 200 that are connected to the components on the computer system 100. The electrically conductive contacts 245 may be used to interface a connector on a second board such as a riser. The electrically conductive contacts 245 and the connector may be used to transmit electrical signals between the motherboard 200 and the second board. According to one embodiment of the present invention, the edge connection 240 includes electrical contacts 245 that are electrically connected to the audio controller 133 and the electrical contacts 245 are used to transmit audio signals between the motherboard 200 and the second board. According to a second embodiment of the present invention, the edge connection 240 includes electrical contacts 245 that are electrically connected to the USB host controller 124 and the electrical contacts 245 are used to transmit USB signals between the motherboard 200 and the second board. According to a third embodiment of the present invention, the edge connection 240 includes electrical contacts 245 that are electrically connected to switch or LED controllers and the electrical contacts 245 are used to transmit switch or LED signals between the motherboard 200 and the second board. It should be appreciated that the electrical contacts 245 may be electrically connected to any component on the motherboard 200 and may be used to transmit any type of electrical signal between the motherboard 200 and the second board.

FIG. 3 illustrates a riser according to an embodiment of the present invention. The riser 300 is a printed circuit board that includes a body having a plurality of edge connectors 310, 320, 330 and 340 disposed on it. The edge connectors 310, 320, 330, and 340 may receive edge connections from other boards. According to an embodiment of the riser 300, edge connector 310 is configured to accept the edge connection 240 (shown in FIG. 2) of the motherboard 200 (shown in FIG. 2). Edge connectors 320, 330, and 340 may be used as expansion slots to connect boards that include other functionalities with the computer system 100 on the motherboard 200 via electrical connections on the riser 300. According to an embodiment of the present invention, edge connector 310 is a female edge connector and edge connection 240 is a male edge connector.

The riser 300 includes a first end 370 and a second end 375 on its body. A plurality of external interfaces 351–356 are connected to the second end 375 of the riser 300. The external interfaces 351–356 may be lights, switches, I/O interfaces, or other interfaces. As an example, external interface 351 may be a power LED that indicates whether the computer system 100 is on. External interface 352 may be a hard drive LED that indicates whether the data storage device 131 is connected to the computer system and is operable. External interface 353 may be a power switch that operates to turn the computer system 100 on and off. External interfaces 354 and 355 may be audio jacks that operate as an input for sending audio signals to the motherboard 200 and an output for sending audio signals from the motherboard 200. External interface 356 may be a USB connector that operates as an input for sending USB signals to the motherboard 200 and an output for sending USB signals from the motherboard 200. It should also be appreciated that any number and any type of external interfaces may be connected to the second end 375 of the riser 300.

The external interfaces 351–356 are electrically connected to the connector 310 via electrical connections 360 and 361 on the riser 300. Electrical connection 360 connects connector 310 with external interfaces 354 and 355. Electrical connection 361 connects connector 310 with external interfaces 351–353, and 356. It should be appreciated that electrical connections 360 and 361 may include a single or a plurality of traces on the riser 300. It should also be appreciated that the electrical connections 360 and 361 may be routed any number of ways from the connector 310 to the external interfaces 351–356 and that FIG. 3 illustrates only an exemplary routing path.

FIG. 4 illustrates a perspective view of a motherboard and riser housed inside a chassis, according to an embodiment of the present invention. The chassis 400 includes a back wall 410 and a front wall 420. The back wall 410 includes an opening 411 that allows components inside the chassis 400 to be accessible from the outside via the back wall 410. The front wall 420 of the chassis 400 includes openings 421 and 422. The openings 421 and 422 at the front wall 420 of the chassis 400 allows components inside the chassis, such as data storage devices, to be accessible from the outside via the front wall 420. The front wall 420 of the chassis 400 also includes a front panel 423 that includes a plurality of openings that allow the external interfaces 351–356 on the riser 300 to be viewed and accessible from outside the chassis 400. The back wall 410 is connected to a first riser mounting device 415. The front wall 420 is connected to a second riser mounting device 425. The first and second riser mounting devices 415 and 425 connect the riser 300 to the chassis 400 and hold the riser 300 in a standing position perpendicular to both the back wall 410 and the front wall 420. It should be appreciated that the front wall 420 and the back wall 411 may include any number of openings and that the first and second riser mounting devices 415 and 425 may be implemented by any known devices.

The motherboard 200 is held in the chassis 400 via the riser 300. The motherboard 200 is connected to the riser 300 via its edge connection 240. When connected to the riser 300, the motherboard 200 is oriented such that the external interfaces 211–214 are accessible from outside the chassis 400 through the opening 411 on the back wall 410 of the chassis 400.

When mounted in the chassis 400, the second end (front end) 375 of the riser 300 is connected to the front wall 420 of the chassis 400 and the first end (back end) 370 of the riser 300 is closely proximated to the back wall 410 of the chassis 400. According to an embodiment of the present invention, the first end 370 of the riser 300 is closely proximated to the back wall 410 of the chassis 400 such that the external interfaces 351–356 on the second end 375 of the riser 300 extend through the openings on the front panel 423 of the chassis 400. The length of the body of the riser 300 is adequate to allow the first end 370 and second end 375 of the riser to be simultaneously situated closely proximated at the back wall 410 and the front wall 420 of the chassis 400 respectively. The second end 375 of the riser is extended to the front panel 423 such that the external interfaces 351–356 mounted on the riser 300 may be brought outside the chassis 400 through the openings on the front panel 423 without requiring cabling.

FIG. 5 illustrates a front wall of a chassis that houses a computer system, according to an embodiment of the present invention. The front wall 420 of the chassis 400 includes a ventilation opening 510. The ventilation opening 510 allows air from outside of the chassis 400 to enter into the chassis. The front wall 420 of the chassis 400 also includes openings 421 and 422 that allow data storage device units to be housed in the chassis 400 and accessible from outside of the chassis 400. The front wall 420 of the chassis 400 also includes a front panel 423. The front panel 423 includes a plurality of openings 551–556. The plurality of openings 551–556 allow the plurality of external interfaces 351–356 on the riser 300 (shown in FIGS. 3 and 4) to extend through the front wall 420 of the chassis 400. The openings 551–556 on the front panel 423 allow the external interfaces 351–356 to be viewable and accessible from outside of the chassis 400. It should be appreciated that the number and shapes of the openings on the front panel 423 may be altered to accommodate the number and type of external interfaces mounted on the riser 300.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. A riser card for use in a chassis, the riser card comprising:
   a body having a first end, a second end, and a length adequate to simultaneously allow the first end and the second end of the riser card to be secured against a back and a front wall of the chassis respectively, vertically disposing said riser card; and
   a female connector disposed on the body to receive a male edge connector of a horizontally disposed motherboard.

2. The riser card of claim 1, further comprising an electrical trace on the body that transmits an electrical signal from the female connector to the second end.

3. The riser card of claim 2, further comprising an audio jack at the second end, the audio jack connected to the electrical trace and outputting audio signals at the front wall of the chassis.

4. The riser card of claim 2, further comprising a Universal Serial Bus (USB) jack at the second end, the USB jack connected to the electrical trace and outputting USB signals at the front wall of the chassis.

5. The riser card of claim 2, further comprising a light emitting diode (LED) at the second end, the LED connected to the electrical trace and emitting light at the front wall of the chassis.

6. A riser, comprising:
   a first end that is secured against a back wall of a chassis;
   a second end that is secured against a front wall of the chassis; and
   an external interface, connected to the second end of the riser, that is accessible through an opening in the front wall of the chassis, such that if the riser is removed from the chassis, the external interface is also removed from the chassis.

7. The riser of claim 6, further comprising a female connector that receives a motherboard edge connection.

8. The riser of claim 7 further comprising an electrical trace that transmits an electrical signal from the female connector to the external interface.

9. The riser of claim 6, wherein the external interface is an audio jack.

10. The riser of claim 6, wherein the external interface is a Universal Serial Bus connector.

11. The riser of claim 6, wherein the external interface is a light emitting diode (LED).

12. A computer system, comprising:
   a chassis having a front wall and a back wall;
   a motherboard housed inside the chassis, said motherboard being horizontally disposed;
   a processor, on the motherboard;
   a memory, on the motherboard; and
   a riser having a first end that is secured against the back wall of a chassis and a second end that is secured against the front wall of the chassis, vertically disposing said riser card, and a female connector that receives an edge connection from the motherboard.

13. The computer system of claim 12, wherein the riser further comprises an electrical trace on the riser that transmits an electrical signal from the female connector to the second end of the riser.

14. The computer system of claim 13, wherein the riser further comprises an audio jack at the second end of the riser, the audio jack connected to the electrical trace and outputting audio signals at the front wall of the chassis.

15. The computer system of claim 13, wherein the riser further comprises a Universal Serial Bus (USB) jack at the second end of the riser, the USB jack connected to the electrical trace and outputting USB signals at the front wall of the chassis.

16. The computer system of claim 13, wherein the riser further comprises a light emitting diode (LED) at the second end of the riser, the LED connected to the electrical trace and emitting light at the front wall of the chassis.

* * * * *